United States Patent [19]

Dochterman

[11] 4,076,197

[45] Feb. 28, 1978

[54] TORSIONAL VIBRATION ISOLATING MOTOR MOUNTING ARRANGEMENT AND METHOD OF MAKING THE SAME

[75] Inventor: Richard W. Dochterman, Fort Wayne, Ind.

[73] Assignee: General Electric Company, Fort Wayne, Ind.

[21] Appl. No.: 697,547

[22] Filed: Jun. 18, 1976

[51] Int. Cl.² .................. F16F 15/04; F16M 11/04
[52] U.S. Cl. .................................. 248/15; 310/91; 417/363
[58] Field of Search ............... 248/14, 15, 17, 18, 248/26, 358 R; 416/500, 244; 417/363; 310/62, 63, 91

[56] References Cited

U.S. PATENT DOCUMENTS

| | | | |
|---|---|---|---|
| 2,731,193 | 1/1956 | Lall et al. | 248/14 X |
| 2,976,352 | 3/1961 | Atalla | 417/363 X |
| 2,977,043 | 3/1961 | Scheldorf | 417/363 |
| 3,059,250 | 10/1962 | Mayer | 248/231 X |
| 3,145,910 | 8/1964 | Jolly | 310/91 X |
| 3,317,124 | 5/1967 | Morrill | 310/91 UX |
| 3,584,469 | 6/1971 | Butts | 310/91 X |
| 3,746,894 | 7/1973 | Dochterman | 417/363 X |
| 3,773,285 | 11/1973 | Morrill | 248/15 |
| 3,790,114 | 2/1974 | Italiano | 248/14 X |
| 3,830,595 | 8/1974 | Carpenter | 248/15 X |

FOREIGN PATENT DOCUMENTS 1,135,085   8/1962   Germany ........................ 310/91

Primary Examiner—J. Franklin Foss
Attorney, Agent, or Firm—Ralph E. Krisher, Jr.

[57] ABSTRACT

Motor mounting system is designed so that the torsional mode resonant or natural frequency is less than twice the frequency of the motor power supply divided by the square root of two ($\sqrt{2}$). The illustrated mounting arrangements are "soft" with respect to torsional mode vibrations, and yet are "stiff" with respect to axial and tilting mode vibrations. In one arrangement, lugs are formed preferably from a tough and strong sheet or strip material with means which may be in the form of tuning apertures being provided for promoting flexure without objectably compromising lug strength for axial loading and with the tuning means preferably selected so that the cumulative effective spring constant of the mounting lugs will be less than the quantity $(2.84 \times I_p \times 10^5)$. Also illustrated are mounting band members and torsionally flexible arms that interfit one with another in a slotted interrelationship so as to assure motor support and minimize the degree of weld or other fastener strength that would otherwise have to be provided between the arms and motor.

11 Claims, 9 Drawing Figures

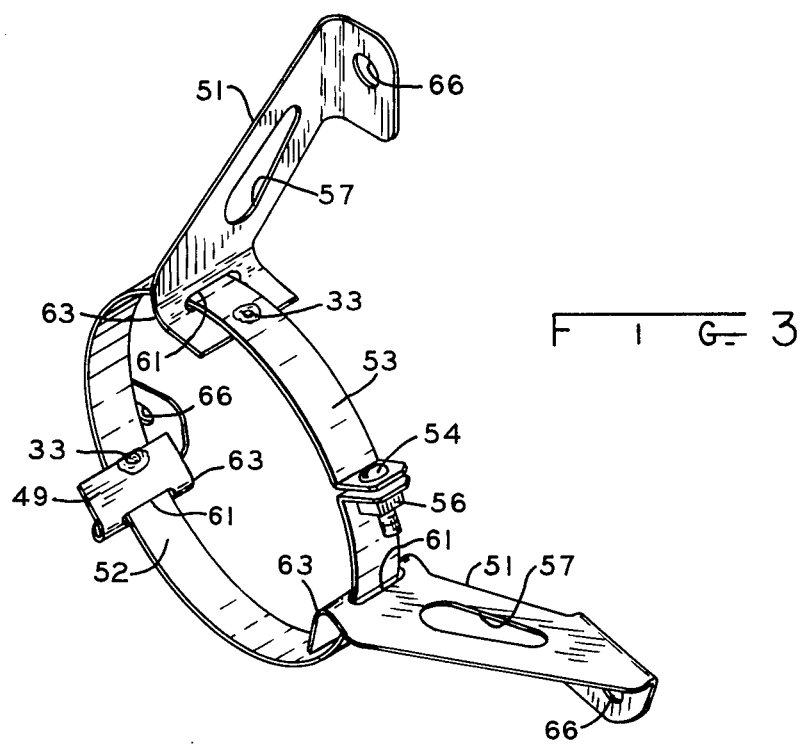
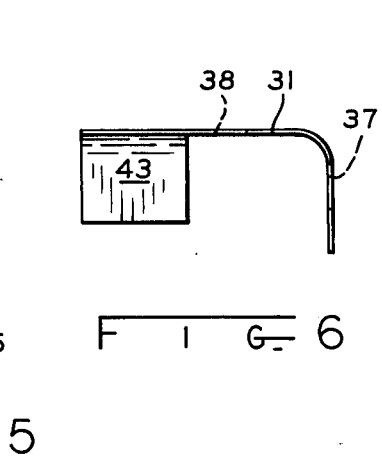
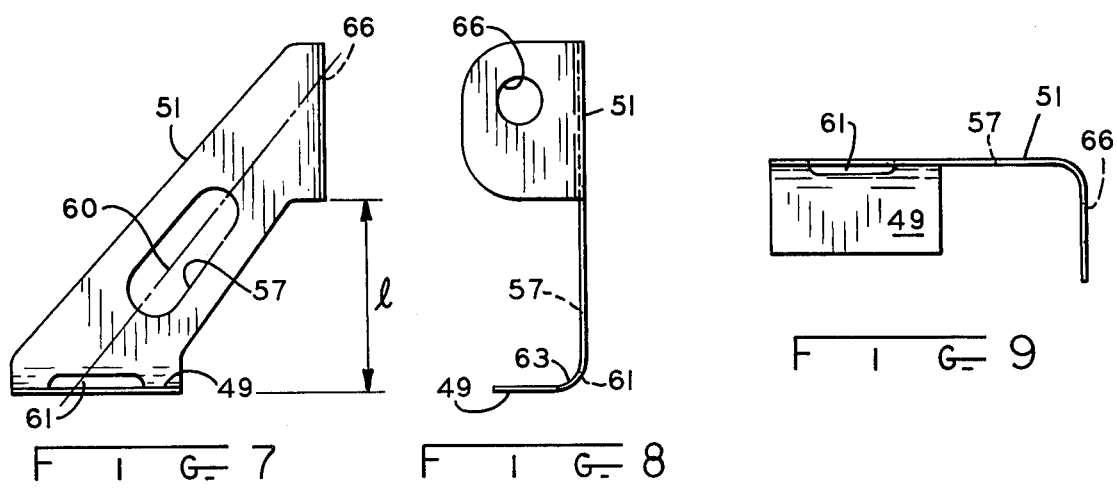

TORSIONAL VIBRATION ISOLATING MOTOR MOUNTING ARRANGEMENT AND METHOD OF MAKING THE SAME

CROSS-REFERENCE TO RELATED APPLICATIONS

The subject matter of this application is generally related to the subject matter of Ernest W. Litch copending patent application Ser. No 636,547, filed on Dec. 1, 1975, and assigned to the same assignee as the present application. The entire disclosure of this copending Litch application is incorporated herein by reference.

BACKGROUND OF THE INVENTION

The present invention relates generally to motor mounting arrangement and to methods of making the same that are particularly useful in connection with mounting a motor to a bulkhead, baffle, or other suitable motor supporting structure of a product in which such motor is used. Examples of such products are: room air conditioners, air circulation fans, and so forth.

In direct drive applications, i.e., applications where blowers or fans are mounted directly to a motor shaft, it is important to isolate motor vibrations from the bulkhead or other mounting surface. It is, or course, desirable to minimize the transmission of all modes of vibrations; but for the reasons pointed out in detail in the above-referenced Litch application, it is especially desirable to minimize the transmission of noise associated with torsional mode motor vibrations. In particular, the noise associated with torsional mode vibrations of twice line frequency and harmonics thereof tend to be very objectionable.

The approaches suggested by Litch constitute advances in the art, although there may be some difficulty in applying those approaches. For example, there may be difficulty if the motor itself is manufactured by a process such that motor parts are secured together by structural adhesive materials; or if the motor is of relatively small mass and output, with the result that special manufacturing methods must be adhered to. More particularly, if a motor stator and bearing system is to be assembled and held together by a structural adhesive material such as epoxy (as taught, for example, in Thompson et al. U.S. Pat. No. 3,165,816, or Rutledge U.S. Pat. No. 3,195,222), it may not be desirable from a manufacturing standpoint to have mounting arms or lugs attached to the shell of the motor during the assembly process. Moreover, for motors of relatively small mass and diameter (and thus relatively small polar moments of inertia of the motor mass), where suitable torsional mode vibration isolation is to be accomplished by suitably reducing the transmissibility of the mounting arms or lugs or torsional mode vibrations, difficulties may be encountered because the dimensions of the motor mounting arms or lugs may have to be reduced to such a size that manufacture thereof may be difficult, specially if the radical length of the arms is to be relatively small.

When martensitic steel is utilized to support a relatively small motor (for example, a motor weighing about 2.7 kilograms and approximately three and eight-tenths inches in diameter), and the mounting bolt-hole circle is approximately seven inches in diameter; martensitic steel mounting arms should be only about 0.0010 of an inch thick for good torsional vibration isolation. However, material this thin generally would be difficult to handle in high volume manufacturing operations and often would not possess sufficient strength to withstand at least some shock loading conditions.

It will therefore be understood that it would be desirable to provide new and improved mounting arrangements for motors wherein such mounting arrangements are characterized by improved torsional vibration isolation characteristics, and yet which may be easily manufactured and assembled with motors that are secured together with structural adhesive materials.

Accordingly, it is a general object of the present invention to provide new and improved motor mounting arrangements and methods of making the same whereby the above-mentioned and other problems may be solved.

It is a more particular object of the present invention to provide a new and improved motor mounting arrangement and methods of making the same, that includes mounting arms which are made of material having sufficient thickness that the manufacture of such arms is facilitated and yet wherein the vibration transmissibility of such arms in objectionable frequency ranges is not objectionally increased because of the material thickness.

It is a further object of the present invention to provide new and improved motors and lug assemblies, as well as methods and means of interconnecting the same, that may be easily modified in order to tune the vibration transmissibility of the vibrating system formed of a motor and a plurality of mounting arms or lugs.

IN SUMMARY OF THE INVENTION

In carrying out the above and other objects of the invention in one preferred form thereof, I provide a new and improved motor mounting arrangement which includes mounting arms specifically designed so that, in accordance with the preferred teachings of the above-referenced Litch application, the torsional mode resonant or natural frequency is less than twice the frequency of the motor power supply divided by the square root of two ($\sqrt{2}$).

The mounting arrangements illustrated herein are "soft" with respect to torsional mode vibrations, and yet are "stiff" with respect to axial and tilting mode vibrations. Moreover, the advantageous features of providing a structurally reliable mounting arrangement, and yet one which is easily deflectable torsionally for easy assembly with a mounting wall or baffle is also provided.

In one specific form illustrated herein, an arrangement is provided that exemplifies the invention in the form of lugs which are flexible in the torsional direction, but strong and stiff in both the axial and radial directions. The lugs are formed preferably from a tough and strong material (such as martensitic steel). The selected material is thicker and substantially stronger and stiffer (even in the radial vibration mode) than would usually be desirable from a torsional vibration isolation standpoint. I then provide means for promoting flexure in the vicinity of the parts of the lugs that will be subject to the most flexure or deflection. These flexure promoting means may be in the form of apertures or holes that are formed along a preselected, longitudinally extending neutral axis of each lug so that the strength of the lug will not be objectionably compromised for axial loading conditions. The means for promoting flexure also constitutes, in preferred embodiments, means for "tuning" the vibrating system so that it will have low transmissibility characteristics for predetermined forcing frequencies. In the most preferred exemplifications, the tuning means will be selected so that the cumulative effective spring constant (in pound-inches per radian) of the mounting lugs will be less than the quantity $(2.84 \times I_p \times 10^5)$, where $I_p$ is the polar moment of inertia measured in pound-inches-seconds$^2$.

When the just described approach is followed, the mounting lugs or arms may be formed of materials sufficiently thick that they can withstand the abuses of normal factory manufacturing, handling, and shipping without becoming permanently deformed, and special metal stamping and forming techniques need not be followed.

In accordance with another specific object of the present invention, I provide mounting band members and torsionally flexible arms that inter-fit one with another in a slotted arrangement. Ends of the arms are folded under a band member so that the ends of the arms are securely trapped by the band member against the outer peripheral surface of the motor. This technique assures that the motor will remain supported by the band member and arms, and minimizes the degree of weld or other fastener strength that would otherwise have to be provided between the arms and motor.

The subject matter which I regard as my invention is set forth in the appended claims. The invention itself, however, together with further objects and advantages thereof may be better understood by referring to the following, more detailed description taken in conjunction with the drawings.

BRIEF DESCRIPTION OF THE DRAWINGS

FIG. 3 is a view of another modified mounting system that may be used with the motor of FIG. 1;

FIGS. 4, 5, and 6 are a side elevation, a front elevation, and a plan view, respectively, of a motor mounting arm used in the arrangement of FIG. 2;

And FIGS. 7, 8, and 9 are a side elevation, a front elevation, and a plan view, respectively, of a mounting arm that is used with the band member of FIG. 3.

In FIG. 1, I have illustrated a motor 20 having three flexible mounting arms 21 attached thereto by means of a number of spot welds 22. The mounting arms 21 are formed of a martensitic grade of steel and may be formed, for example, of a 140,000 or 160,000 psi "MartInsite" steel sold by the Inland Steel Company.

The motor 20 in fact was only about 3.8 inches in diameter and 4 inches long (about 6¾ inches long overall from end of shaft to end of shaft). Moreover, the motor 20 was a one-eighth horsepower, 4 pole shaded pole motor with an extended winding section to permit multi-speed operation. This motor weighed about 2.7 kg.

Figure 1:
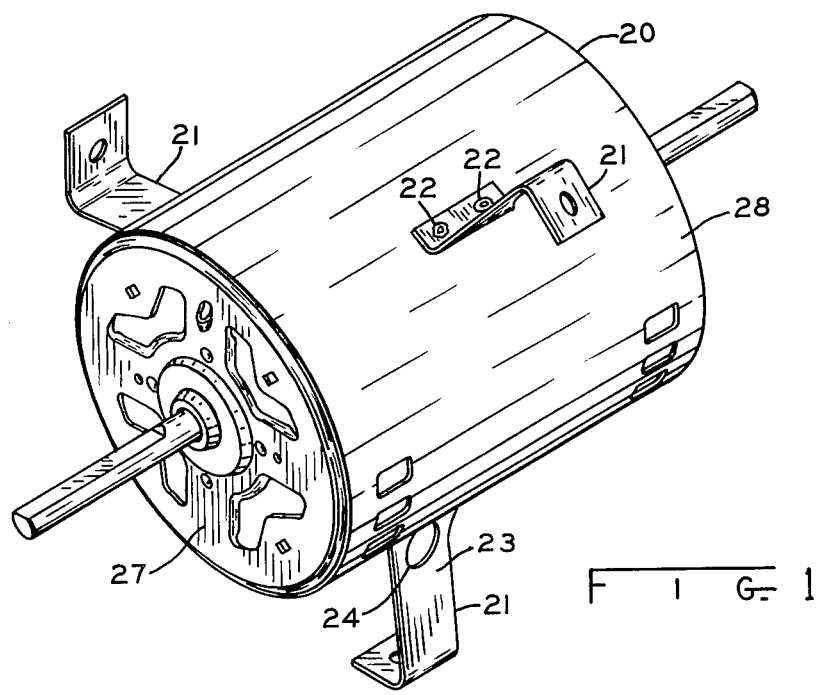
FIG. 1 is a perspective view of a motor having attached thereto mounting means in accordance with one form of the present invention.

The mounting arms 22 had a radical length as observed in FIG. 1 so that they could be bolted to a baffle wall having an internal mounting diameter of about six inches. If arms similar to arms 21 were used with the radially extending portions 23 thereof solid pieces of material, they would be characterized by relatively high transmissibility. In order to reduce the transmissibility of the mounting arm 22, I preferably provide holes 24 of an arbitrary size in the radially extending portions thereof, perform noise transmissibility tests, and then progressively increase or decrease the size of the holes or apertures until the desired degree of vibration isolation is obtained. The size of openings 24 could also be calculated by making a structural analysis and calculating the strength and torsional spring constant of an arm 21 with an assumed opening size, by following known engineering calculation techniques.

It should now be apparent that when my teachings are followed, material may be selected for use in the manufacture of torsionally flexible mounting arms on the basis of easy manufacturability and machining of such material and the availability of standard thicknesses of such material. The resonant frequency of the arm for torsional mode vibrations can then be established at a desired value by modifying the spring characteristics of the lug by providing tuning holes or openings therealong. Thicker material usually would be selected for manufacturing reasons and also for mounting strength from a standpoint of buckling, tilting, and axial mode vibrations. The apertures 24 may be any desired shape, and reduce the area moment of inertia of the cross-sections of the arms 21 in the region of maximum flexure. Thus, an opening 24 should be located generally in the region of maximum flexure of a mounting arm 21. The region of maximum flexure may be readily determined by testing motor 28 while observing it under a strobe light that is energized at the same frequency as the particular vibration frequency of concern.

The tuning of arms 21 by providing apertures therein reduces the area moment of inertia of the cross-section of the lug as mentioned hereinabove, and reduction of this moment of inertia will increase the deflection of the mounting arm during operation of a given motor 20 under given conditions. Increased deflections in an arm 21 indicates a reduced stiffness of the arm and a lower natural frequency of the spring mass system involving the motor 20 and mounting arms 21. This, as will be understood from the above-referenced Litch application, desirably reduces the transmissibility of vibrations caused by operation of the motor 20.

For some applications, where the end frames 27 of a motor are to be secured to a housing or shell 28 of a motor by epoxy or other suitable engineering adhesive materials; it may be preferred to avoid subjecting the housing 28 to the localized heating effects that might take place when making spot welds 22. On the other hand, if the arms 21 are welded to the shell 28 prior to the process of securing the end frames 27 to the shell 28, the presence of the arms 21 may interfere during previously adopted processing steps that are followed when securing the end frames 27 to the stator housing 28. In such an event, a bandtype mounting arrangement may be preferred to the arrangement shown in FIG. 1. Two alternate band-type mounting arrangements are shown in FIGS. 2 and 3, with the arrangement shown in FIG. 2 generally being preferred from a material utilization and ease of manufacture standpoint.

Figure 2:
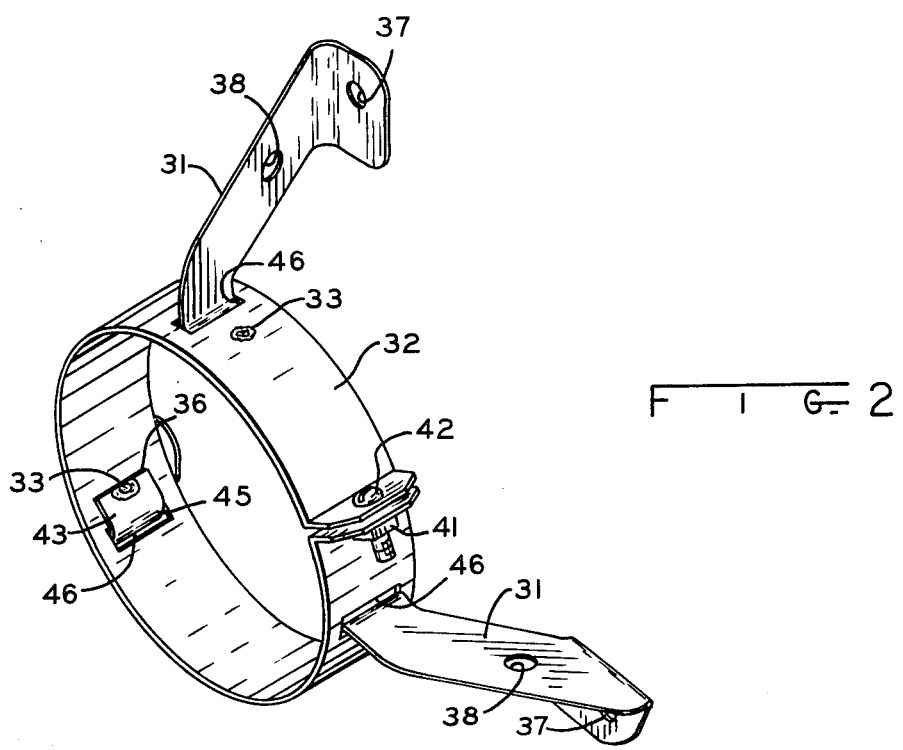
FIG. 2 is a view of a modified mounting system usable with the motor of FIG. 1.

Before commencing with a detailed description of the arrangements shown in FIGS. 2 and 3, it should also be noted that the technique of using welding straps as taught in the above-referenced Litch application may be followed rather than simply using spot welds as shown at 22 in FIG. 1. However, if the motor 20 is of small enough mass, and the application and shipping rigors to which the motor and arms 21 are to be subjected are not too great, the arms 21 may be welded directly to the motor housing 28 without objectionable results. It should be emphasized, however, that the suitability of directly welding arms 21 to the motor should be determined only by a thorough analysis of the particular application for the motor and mounting arrangement, and adequate testing of the selected arrangement.

In FIG. 2, three substantially identical mounting arms 31 are shown tacked by spot welds to ligature means in the form of a slotted band 32. The motor mounting ends of the arms 31 are welded as best revealed at weld spots 33. The amount and extent of each weld 33 is minimal in order to avoid undesirable degradation of the structural characteristics of the arms 31 when they are formed of martensitic steel. By locating the welds 33 adjacent the extreme end 36 of the arms 31, and by limiting the extent (and thus strength) of the weld so that it is just sufficient to hold the arms 31 in place on the band member 32 until the band has been slipped over the outer diameter of the motor 20; I take advantage of minimally expensive welding techniques without adversely affecting the martensitic grain structure characteristics of the arm 31. Of course, if the arms 31 were made of common steel there would be little (if any) concern about the annealing effect that would be caused by a welding operation.

A typical arm 31 is shown in detail in FIGS. 4, 5, and 6; and reference is now made to those figures in conjunction with FIG. 2. It will be noted that the arms 31 are provided with fastener receiving apertures 37 which can accommodate fasteners that would be used to mount a motor (trapped within the band 32) to a suitable mounting structure or baffle. Moreover, each arm 31 includes a tuning aperture 38 which is provided for the purpose of reducing the resonant frequency of the mounting arms 31. As will be understood, the arrangement shown in FIG. 2 may be slipped over the outer periphery of a motor such as the motor 20 (assuming that the arms 21 had not been supplied therewith, of course) and fastener means such as nut and screw 41, 42 will be tightened in order to tightly clamp the band 32 about the motor.

When the band 32 is tightened, the band itself will be placed in hoop tension and the feet or motor ends 43 of the arms 31 will be tightly clamped against the outer surface of the shell or housing 28 of the motor 20. Since the feet 43 will be tightly clamped against the motor, it should now be apparent that it would be redundant to provide a weld of sufficient extent and strength to permanently withstand separation of an arm 31 from the band 32. This desirable and economical arrangement is facilitated by slotting the band 32 as best shown at 46 and slipping the motor ends of the arms 31 therethrough, and then welding or tacking the motor ends 43 of the arms to the inner surface of the band member.

The same general technique that was just described is also followed in the arrangement of FIG. 3 where the motor ends 49 of the mounting arms 51 are tacked with a small weld to the inner surface 52 of band 53. Again, a screw and nut 54, 56, may be used to tightly clamp the band 53 about the outer periphery of a motor. It will be noted that the arms 51 also include tuning apertures 57 which were provided to reduce the natural frequency of the arms 51 with respect to torsional mode vibrations. The arrangement of FIG. 3 shows the band 52 extending through slots 61 formed adjacent to the bend 63 of each arm 51. Moreover, each arm 51 is obviously provided with a mounting aperture 66 which may be used to mount the mounting arrangement of FIG. 3 (with the motor held thereby) to a suitable mounting structure or housing. It should also be apparent that the holes 66 (or holes 37) may be located at different effective radial distances in order to facilitate mounting to different mounting bolt circles.

It will be appreciated that with the arrangements shown in both FIG. 2 and FIG. 3, an interlocking slot and locking tab arrangement are provided between a band member and a mounting arm along a bent portion thereof. Moreover, it should be apparent that whether the arrangement of FIG. 2 or FIG. 3 is used will primarily be a matter or choice; although fabrication generally should be easier with the approach shown in FIG. 2. Moreover, whether the arrangement of FIG. 2 or FIG. 3 is utilized, it is necessary only to provide a small tack or spot weld (or to use any other suitable, relatively low strength fastening means) for holding mounting arms in desired position relative to a band member. The actual assembly of the band member onto and about a motor housing then will firmly and tightly trap the mounting arms in a desired position against a motor housing or shell.

Whether the arrangements such as those shown in FIGS. 1, 2, or 3 are utilized, it is also desirable, in many applications, to utilize a material thicker than would otherwise be desired, and to tune the mounting arm made from such material so that it will have a lower resonant or natural frequency by providing one or more tuning apertures therein.

Specific examples of motor-motor mounting systems embodying my invention that have been constructed and tested are presented in Table I hereinbelow.

Each of the systems of Table I were constructed to mount on a seven inch mounting bolt circle, and the mounting arms (corresponding to arms 31 or 51 in FIGS. 2 and 3) were made, in each case, from 140,000 psi "MartInsite" steel having a thickness of 0.018 inches thick. Since preliminary calculations would indicate that such material should only be 0.010 of an inch thick, each arm had a tuning aperture therein so that the cumulative effective torsional spring constant $K_T$ for each exemplary system (in pound-inches per radian) had a value as listed in Table I. It will be understood that in cases where each mounting arm is substantially identical (as shown in FIGS. 2 and 3), and where the total number of mounting arms per system equals the number "$n$"; the torsional spring constant for each arm will be the cumulative effective torsional spring constant of the system divided by "$n$". By way of further explanation, each of the systems represented in Table I did in fact include three mounting arms.

Table I

| System | Motor O.D. (in) | $W_n$ (hz) | $I_p$ (lb-in-sec$^2$) | $K_T$ (lb-in/rad) | $2.84 \times I_p \times 10^5$ |
|---|---|---|---|---|---|
| A | 3.3 | 36.2 | 0.01223 | 632.7 | 3473 |
| B | 3.8 | 17.6 | 0.02054 | 251.2 | 5833 |
| C | 3.3 | 18.6 | 0.01229 | 167.8 | 3490 |
| D | 3.3 | 46 | 0.01364 | 1139 | 3874 |
| E | 3.3 | 39.2 | 0.01223 | 741.9 | 3473 |
| F | 3.8 | 15.3 | 0.0292 | 269.8 | 8292 |
| G | 3.8 | 16.8 | 0.01939 | 216 | 5507 |

The data presented in Table I indicates, for each system A through G; the approximate motor outer diameter in inches (O.D.); the natural or resonant frequency in hertz ($W_n$); the polar moment of inertia of the system in lb-in-sec$^2$ (Ip), assuming that the polar moment of inertia of the motor stator only constitutes the polar moment of inertia of the system (and thus ignoring any effect of the mounting arms and band); the calculated value of the torsional spring constant of each system in lb.-in. per radian ($K_T$); and the calculated value for 2.84×Ip×10$^5$. Although Table I does not reveal the damping factor for each system A through G, it is now noted for disclosure purposes that the damping factor for each listed system was about 0.02.

A review of the data in Table I quickly reveals that the resonant frequency for each system was substantially less than twice line frequency (120 hz) divided by the square root of two. In addition, the total cumulative effective spring constant of the system was less, in every case, then the quantity 2.84×Ip×10$^5$.

The data for Table I was generally determined by measurement or observation, coupled with mathematical calculations when necessary except for the quantities $K_T$ and 2.84×Ip×10$^5$ which were simply calculated. As will be understood, $K_T$ for each system was calculated (after $W_n$ and $I_p$ for each system had been determined) by using the well known relationship $$W_n = \frac{1}{2\pi}\sqrt{\frac{K_T}{I_p}}$$

The resonant frequency was determined, in every case, by mounting the system to a support, attaching an accelerometer to the motor, and feeding low frequency power to the motor. The motor then is excited through a low frequency range, and the accelerometer output was observed to determine the lowest resonant frequency.

The polar moment of inertia of the stator can be determined by following the procedures published at page 200 of the May 23, 1968 issue of *Machine Design* magazine, or by: suspending a reference mass (also called a "calibrated inertia") having a known polar moment of inertia ($I_C$) from a wire and observing the time ($T_1$) for the reference mass to make "N" oscillations; suspending a motor stator with a bore plug adaptor having a known or determinable polar moment of inertia ($I_A$); and measuring the time ($T_2$) for the stator and bore plug adaptor to make "N" oscillations.

The time ($T_C$) for one oscillation of the calibrated inertia would be determined from the relationship: $T_C = T_1/N$; and the torsional spring constant of the wire (K) will then be determined from the relationship: $K = I_C/T_C^2$.

The time ($T_R$) for one oscillation of the motor stator and adaptor plug is calculated from the relationship: $T_R = T_2/N$; and the inertia ($I_R$) of the motor stator and plug would be determined from the relationship: $I_R = KT_R^2$ or $I_R = (T_R/T_C)^2 I_C$. The value of the polar moment of inertia of the bore plug adaptor would then be subtracted from the calculated value of "$I_R$" in order to determine the value of the polar moment of inertia of the motor stator alone.

The importance of reducing the *area* moment of inertia of the lugs or arms 31 (or 51) by providing tuning apertures along the longitudinally extending neutral axes 30 or 60 will be better appreciated from the following relationships for the lug or arm when it is fastened at one end to the motor and at the bulkhead at the other end:

$$Y = \frac{1}{EI}\left(-\frac{Ml^2}{2} + \frac{Fl^3}{3}\right) \quad (1)$$

$$M = \frac{T}{3} - FR \quad (2)$$

$$F = \frac{T\left(1 + \frac{l^2}{2R}\right)}{lR + l^2 + \frac{l^3}{3R}} \quad (3)$$

where:
 Y = deflection of arm or lug
 E = young's modulus for arm
 I = moment of inertia of the cross-sectional area of the lug
 M = moment exerted by the motor
 F = tangential force exerted by the motor
 l = active length of lug (see FIGS. 4 and 7)
 T = motor torque at operating speed
 R = radius from center of motor shaft to outer surface By substitution of the above relationships in order to eliminate the quantities "M" and "F" from equation (1), and by selecting "l" to be 1.23 inches and "R" to be 1.649 inches; equation (1) reduces to:

$$Y = (1/E\,I)(.0164T) \quad (4).$$

This equation clearly reveals that, for a given motor, increased deflections (and thus a lower torsional spring constant) will result when the moment of inertia of the cross-sectional area of the lug is reduced. Moreover, since the spring constant for a lug will be inversely proportional to the deflection, the above relationships may be used as a guide in selecting the size of the apertures 38 or 57 for a given arm or lug 31 or 51 that is to be used with a motor of radius "R" and torque "T".

While I have now shown and described preferred and alternate embodiments of arrangements embodying the invention and methods of making and using the same; the disclosure contained herein should be construed as being exemplary in nature, and the invention itself, therefore, should be limited only by the scope of the claims that are appended hereto and that form part of my disclosure.

What I claim as new and desire to secure by Letters Patent of the United States is:

1. A torsional mode vibration isolating mounting arrangement for an alternating current induction motor designed for excitation by an alternating voltage of a predetermined source frequency, and wherein said motor has a polar moment of inertia Ip, measured in pound-inches-seconds$^2$, said mounting arrangement including a plurality of arms, formed from flat sheet material, extending radially from the motor and each having at least one tuning aperture formed therein with each aperture lying generally along a different generally radially extending plane; said tuning apertures being sized and located so that the cumulative effective spring constant, in pound-inches per radian will be less than the quantity 2.84 × Ip × 10$^5$.

2. The invention of claim 1 wherein the arms are dimensioned so that the cumulative effective spring constant thereof would be at least equal to 2.84 × Ip × 10$^5$ when no material is removed therefrom to provide tuning apertures, and wherein the ratio of twice the source frequency to the resonant frequency of the mounting system is greater than the square root of two.

3. The invention of claim 1 wherein each of the generally radially extending planes contain a longitudinally extending neutral axis and the tuning apertures are each generally symmetrical about one of the neutral axes, whereby the apertures in the arms do not substantially reduce the strength of the arms in the axial direction.

4. The invention of claim 1 wherein each of the arms has a tuning aperture located therein along the region of the arm subject to maximum deflection caused by torsional mode motor vibrations.

5. The invention of claim 1 wherein the arms each have a motor end thereof tightly trapped against the motor by band means.

6. The invention of claim 5 wherein the band means and arms inter-fit, one with another, in a slotted arrangement.

7. The invention of claim 6 wherein the motor ends of the arms are fastened to the band means.

8. The invention of claim 7 wherein the motor ends of the arms are welded to the band means, and the tightly trapped condition of the motor ends relieves the stress on the fastened interconnection of the band means and arms.

9. A torsionally flexible mounting system for an induction motor comprising a band member and a plurality of flexible arms; said flexible arms each inter-fitting with the band member in a slotted arrangement and having a motor end lying against an internal circumferential portion of the band member; said flexible arms being made of martensitic steel and having the extremity thereof at the motor end tack welded to the band member at at least one weld location on each motor arm, with the structural characteristics of the martensitic steel at each weld location degraded as a result of such weld; said band member tightly trapping the motor ends of the flexible arms flat against the motor whereby the structural integrity of the mounting system is assured notwithstanding the weld associated degradation of the arms at said weld locations.

10. The invention of claim 9 wherein the motor has a polar moment of inertia $Ip$ measured in pound-inches-seconds$^2$, and the flexible arms establish a system having a cumulative effective spring constant, in pound-inches per radian, less than the quantity $2.84 \times Ip \times 10^5$.

11. A mounting arrangement for a motor comprising a band member for extending about an outer peripheral surface of a motor, and a plurality of mounting arms each having a motor end trapped between the outer peripheral surface of the motor and an inner peripheral surface of the band member; and wherein said band member has slots formed therein, the mounting arms each are bent and have an end thereof extending through a slot in the band member, and wherein each mounting arm is provided with tuning apertures in order to promote the deflection thereof in response to torsional mode motor vibrations and thereby reduce the transmissibility of torsional mode vibrations from the motor.

* * * * *

UNITED STATES PATENT AND TRADEMARK OFFICE
CERTIFICATE OF CORRECTION

PATENT NO. : 4,076,197
DATED : February 28, 1978
INVENTOR(S) : Richard W. Dochterman It is certified that error appears in the above-identified patent and that said Letters Patent are hereby corrected as shown below:

Col. 1, line 56, delete "or" and insert --of--;
       line 60, delete "radical" and insert --radial--.

Col. 3, line 55, delete "4 inches" and insert --4-1/4 inches--;
       line 61, delete "radical" and insert --radial--.

Signed and Sealed this

Twenty-seventh Day of June 1978

[SEAL]

Attest:

RUTH C. MASON
Attesting Officer

DONALD W. BANNER
Commissioner of Patents and Trademarks